United States Patent [19]

Chandler

[11] 4,427,944

[45] Jan. 24, 1984

[54] SYSTEM FOR PERMEABILITY LOGGING BY MEASURING STREAMING POTENTIALS

[75] Inventor: Richard N. Chandler, Houston, Tex.

[73] Assignee: Schlumberger Technology Corporation, New York, N.Y.

[21] Appl. No.: 459,010

[22] Filed: Jan. 18, 1983

Related U.S. Application Data

[63] Continuation of Ser. No. 165,997, Jul. 7, 1980, abandoned.

[51] Int. Cl.$^3$ .............................................. G01V 3/18
[52] U.S. Cl. .................................................... 324/353
[58] Field of Search ............... 324/323, 347, 351, 353, 324/355, 366, 367

[56] References Cited

U.S. PATENT DOCUMENTS

| | | | |
|---|---|---|---|
| 2,433,746 | 12/1947 | Doll | 324/353 |
| 2,475,354 | 7/1949 | Doll | 324/353 |
| 2,814,017 | 11/1957 | Doll | 324/353 |
| 2,974,273 | 3/1961 | Vogel et al. | 324/353 |
| 3,116,449 | 12/1963 | Vogel | 324/355 X |
| 3,138,219 | 6/1964 | Blizard | |
| 3,599,085 | 8/1971 | Semmelink | 324/353 X |
| 3,599,156 | 8/1971 | Miller et al. | |
| 3,648,278 | 3/1972 | Miller et al. | 324/323 X |
| 4,043,192 | 8/1977 | Shuck | |

OTHER PUBLICATIONS

Abaza et al., "Evaluation of the Rate of Flow . . . Using Electrokinetic Phenomena", *Water Resources Research*, vol. 5, No. 2, Apr. 1969, pp. 470-483.
Boit, M. A., "General Theory of Three Dimensional Consolidation", *Journal of Applied Physics*, vol. 12, Feb. 1941, pp. 155-164.
Carslaw et al., *Conduction of Heat in Solids*, Oxford, Clarendon Press, 1959, pp. 133-161.
Geertsma et al., "Some Aspects of Elastic Wave Propagation in . . . Porous Solids", *Geophysics*, vol. XXVI, No. 2, Apr. 1961, pp. 169-181.
Kruyt, H. R., *Colloid Science*, New York, Elsevier Publishing, 1952, pp. 204-207.
Rice et al., "Some Basic Stress . . . with Compressible Constituents", *Reviews of Geophysics and Space Physics*, vol. 14, No. 2, May 1976, pp. 227-241.
Schriever et al., "Streaming Potential in Spherical Grain Sands", *Journal of the Electrochemical Society*, vol. 104, No. 3, Mar. 1957, pp. 170-176.
Sennet et al., "Colloidal Dispersions . . . Concept of the Zeta Potential", *Chemistry and Physics of Interfaces*, Wash., D. C., Amer. Chem. Soc. Pub. 1965, pp. 75-92.

*Primary Examiner*—Gerard R. Strecker
*Attorney, Agent, or Firm*—Stephen L. Borst

[57] ABSTRACT

Method and apparatus for investigating earth formations according to the present invention include positioning an opening of a fluid reservoir in contact with the surface of an earth formation to be investigated and injecting the fluid at high pressures through the opening into the formation to cause a transient electrokinetic potential to form in the formation. The transient streaming potentials generated are detected by appropriate electrodes, and the outputs of the electrodes, representative of the generated potentials, are then processed to determine a characteristic response time of these streaming potentials. Thereafter, from a knowledge of the characteristic response time of the detected streaming potentials a measurement of the permeability of the formation is derived.

26 Claims, 7 Drawing Figures

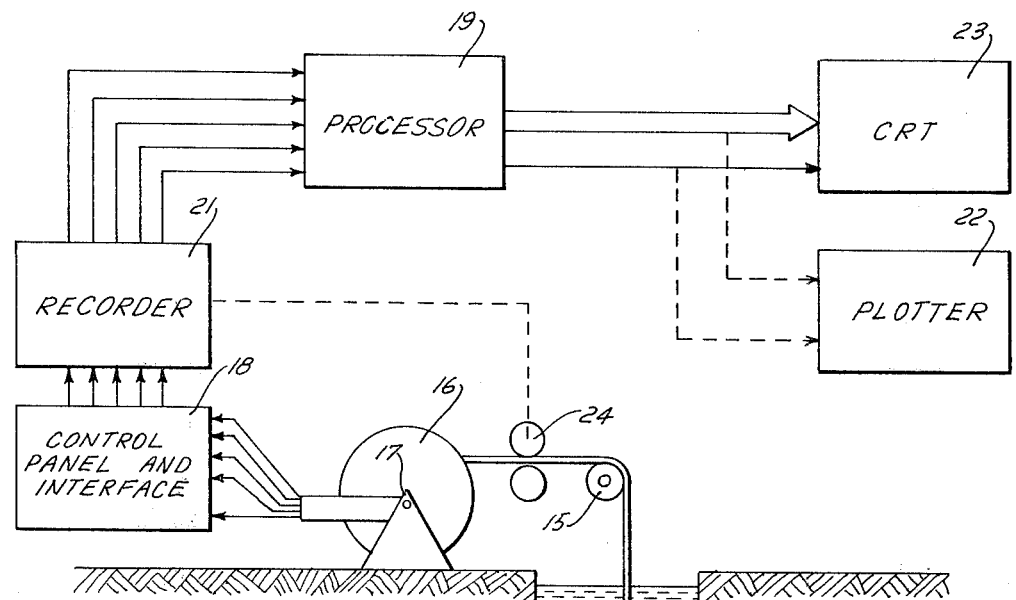
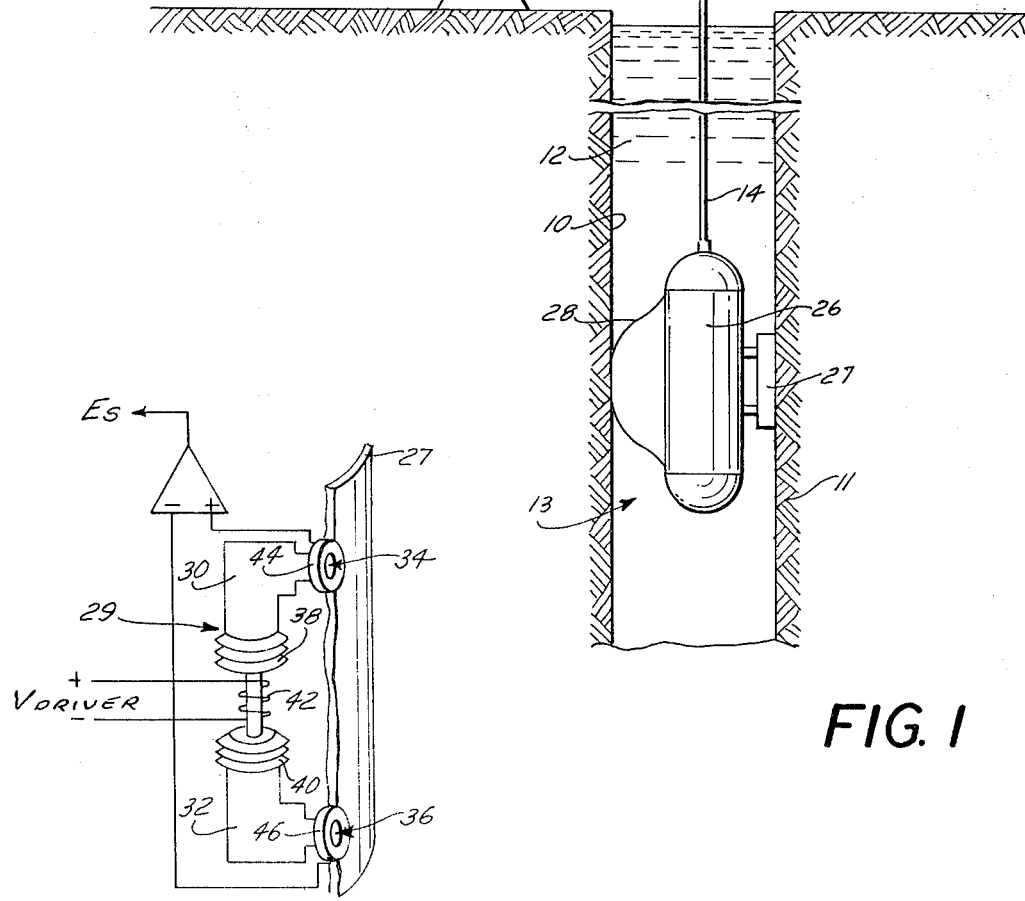
FIG. 1
FIG. 2

SYSTEM FOR PERMEABILITY LOGGING BY MEASURING STREAMING POTENTIALS

A continuation of copending application Ser. No. 165,997 filed on July 7, 1980, now abandoned, which is hereby incorporated by reference herein.

BACKGROUND OF THE INVENTION

The present invention relates to methods and apparatus for investigating the permeability of earth formations traversed by a borehole, and more particularly to novel and improved methods and apparatus for determining the permeabilities of formations by obtaining indications of characteristic response times of transient streaming potentials induced in the formation by the application of pressure pulses to the formation.

Heretofore, in some prior art practices, information relating to the location and permeability of subsurface earth formations has been obtained by electrical logging methods which are based at least in part on the electrokinetic potential phenomenon that occurs when relative movement is induced between a formation and the fluid contained in the matrices of the formation material. For example, in U.S. Pat. No. 2,814,017, issued Nov. 19, 1957 to Henri-Georges Doll, methods are described for investigating the permeabilities of earth formations by observing the differences in phase between periodic pressure waves passed through the formations and potentials generated by the oscillatory motion of the formation fluid caused by these pressure waves. Conversely, a periodically varying electric current was suggested to be used to generate oscillatory motion of the formation fluid, which in turn generated periodic pressure waves in the formation. Measurements were to be made of the phase displacement between the generating and the generated quantities and a direct indication of the relative permeability of the formation thereby obtained.

In U.S. Pat. No. 3,599,085, to A. Semmelink, entitled, "Apparatus For Well Logging By Measuring And Comparing Potentials Caused By Sonic Excitation", the application of low-frequency sonic energy to a formation surface is proposed so as to create large electrokinetic, or streaming, pulses in the immediate area of the sonic generator. In accordance with the disclosure of that patent, the electrokinetic pulses result from the squeezing (i.e. the competition of viscosity and inertia) of the formation, and the streaming potential pulses generate periodic movements of the formation fluid relative to the formation rock. The fluid movement produces detectable electrokinetic potentials of the same frequency as the applied sonic energy and having magnitudes at any given location directly proportional to the velocity of the fluid motion at that location and inversely proportional to the square of the distance from the locus of the streaming potential pulse. Since the fluid velocity was found to fall off from its initial value with increasing length of travel through the formation at a rate dependent in part upon the permeability of the formation rock, it was suggested that the magnitude of the electrokinetic potential at any given distance from the pulse provided a relative indication of formation permeability. By providing a ratio of the electrokinetic potential magnitudes (sinusoidal amplitudes) at spaced locations from the sonic generator, from which electrokinetic skin depth may be derived, actual permeability can in turn be determined.

Although these above-mentioned methods yield useful data relating to the borehole logging of subsurface formations, it is desirable to obtain permeability information through yet other methods which are believed to yield more useful results. More particularly, as provided by the present invention, pressure pulse excitation of the formation causes a transient flow to occur in the formation, and a measurement of the characteristic response time of the transient streaming potentials generated in the formation by such flow is employed to derive more accurate information relating to formation permeability.

SUMMARY OF THE INVENTION

There are provided, in accordance with principles of the present invention, methods and apparatus for determining the permeability of a subsurface earth formation, including the steps of applying a pressure pulse to the surface (wall) of the borehole within a formation thereby causing an electrokinetic potential transient to occur in the formation, and measuring a characteristic response time of the transient generated in the formation near the location where the pressure pulse is applied.

In further accordance with principles of the present invention, the application of a pressure pulse to the surface of the formation is accomplished through the injection into the formation of a fluid in a manner such as to effect the generation of a fast rising pressure pulse to cause the formation of an electrokinetic potential transient in the formation as well as the propagation of a diffusion front in the formation. This fast rising pressure pulse is advantageously generated to simulate a step function rise in pressure through the formation, or as close thereto as practicable, so that the resulting streaming potential transient is suitable for enabling an analysis of the characteristic response time of electrokinetic streaming potential induced by the pressure pulse.

Yet in further accordance with principles of the present invention, fast rising pressure pulses may be generated by the inducement of differential pressures, through the use of a bellows arrangement with an alternating pressure polarity. This alternating pressure polarity enables a measurement of the characteristic response time of the transients generated in the formation while reducing the effect of static background noises, such as spontaneous potentials or electrode potentials. The characteristic decay (or bellows) time of the streaming potential induced by the differential pressure is then related to the permeability of the formation at the area of pressure generation. While pressure pulses are advantageously induced by the injection of a fluid at a high rate into the formation, other methods, contemplated by the inventor, such as, stressing the porous formation aggregate may be satisfactory so long as they effect the formation of a measurable electrokinetic streaming potential transient.

Yet in further accordance with principles of the present invention, the effects of compression associated with the mechanical nature of a fluid reservoir of a bellows or piston arrangement, employed to inject fluid into the formation, can be disregarded by limiting the observations of the characteristic response time of the generated streaming potentials to respectively early portions of these induced potentials. This is due to the realization by the inventor that in these early portions the system compression is related mostly to the fluid compression in the formation and hence to formation permeability and that only later in time do the effects of the reservoir (e.g. bellows spring) compression become a large factor. Furthermore, by limiting the observations or measurements to these earlier portions, the need for a good seal between the formation and the opening of a fluid chamber, through which fluid is injected to generate the pressure pulse, is diminished.

In further accordance with principles of the present invention, the behavior of formation rock matrix when subject to compressional forces has been found to be sufficiently relevant to obtaining accurate permeability measurements, that it is accounted for in the practice of the present invention. This is advantageously accomplished by including as a correction factor for the permeability measurement a measurement of matrix compressional properties, e.g., obtained from a sonic log. In the absence of information regarding matrix compressional properties it may be satisfactory, by an analysis of the characteristic response time of the early portions of the respectively induced transient streaming potentials to derive a lower boundary value for the formation permeability. An upper boundary value may then be derived from an analysis of later portions of the characteristic response time of the induced transient streaming potentials.

More specifically, a method and apparatus for investigating earth formations according to the present invention include positioning an opening of a fluid reservoir in contact with the surface of a borehole in an earth formation to be investigated and injecting the fluid at high pressures through the opening into the formation so as to excite the formation and cause an electrokinetic potential transient to be produced in the formation. The streaming potential transients generated in the formation are detected by appropriate electrodes and the output of the electrodes, representative of the generated potentials, is then processed to determine characteristic response times of these streaming potentials. Thereafter, from a knowledge of the characteristic response time of the detected streaming potentials a measurement of the permeability of the formation is derived.

BRIEF DESCRIPTION OF THE DRAWINGS

In the accompanying drawings:

FIG. 1 is a schematic diagram of suitable apparatus for investigating the permeability of earth formations traversed by a borehole in accordance with the present invention;

FIG. 2 is a schematic diagram of certain details of the pad portion of the apparatus of FIG. 1, showing the relative positions, in accordance with one embodiment of the present invention, of fluid reservoirs and electrodes;

DESCRIPTION OF A REPRESENTATIVE EMBODIMENT

Figure 3:
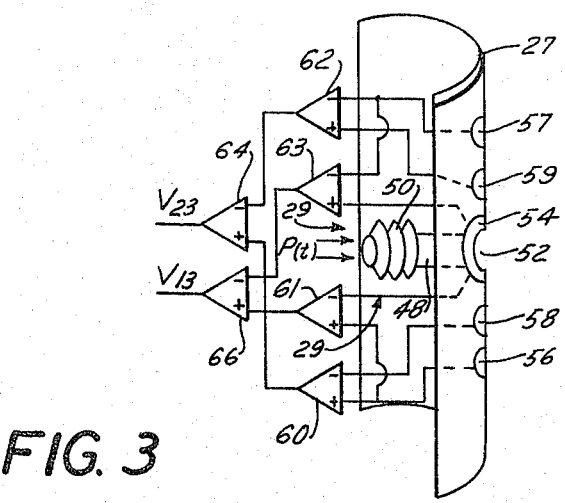
FIG. 3 is a schematic diagram of certain details of the pad portion of the apparatus of FIG. 1, in accordance with another embodiment of the present invention.

Referring to FIG. 1, a representative apparatus for investigating the permeability of subsurface earth formations in accordance with the present invention is shown disposed in an uncased borehole 10 traversing a subsurface earth formation 11 and containing a borehole fluid 12. Mechanical and electrical control of the downhole tool 13 may be accomplished with a multiconductor cable 14 which passes from the downhole tool 13 through the borehole to a sheave wheel 15 at the surface and then to a suitable drum and winch mechanism 16. Electrical connections between various conductors of the multiconductor cable and various electrical circuits at the surface of the earth are accomplished by means of a suitable multi-element slip-ring and brush contact assembly 17. In this manner, the signals which originate from the downhole investigating tool are supplied to a control panel 18 which in turn supplies signals to a processor 19 and a recorder 21. A suitable signal generator (not shown) supplies current to the downhole tool and to signal processing circuits forming part of processor 19, located at the surface.

Signals obtained from the downhole device may be recorded graphically by a plotter 22 and displayed on a CRT 23. In addition, the signals may be processed to obtain discrete samples which may then be recorded on digital tape. A suitable digital tape recorder is described in U.S. Pat. No. 3,648,278 issued to G. K. Miller, et al. on Mar. 7, 1972. The signals may be sampled by driving sampling devices, such as those described in the above-mentioned Miller, et al. patent, by the cable motion as measured at the surface. For example, a cable length measuring wheel 24 may be used in controlling the signal processing, sampling and recording functions as indicated by signal line 25. Therefore, each sample of a measured signal can correspond to one increment in depth and displacements determined between such sample signals would be indicative of depth displacements.

The measured signals or samples thereof may also be transmitted directly to a computer located at the well site. Alternatively, the signals may be transmitted via a transmission system to a computer at a remote location. One transmission system which may be used is described in U.S. Pat. No. 3,599,156 issued to G. K. Miller, at al on Aug. 10, 1971.

The recorded or transmitted signals may be processed as digital measurements by general purpose digital computing apparatus properly programmed in a manner to perform the processes described herein or by special purpose computing apparatus composed of modules arranged to accomplish the described steps to accomplish the same process. The signals may also be processed directly at the well site, using conventional digital computing apparatus forming part of the processor 19 when properly programmed and interfaced to signal conversion means (not shown). One such computing apparatus is the Model PDP-11/45 obtainable from Digital Equipment Corporation. Suppliers of such equipment may also supply signal conditioning circuits and signal conversion means suitable for conditioning and converting analog signals to digital samples for subsequent digital storage and processing. Further, such computing apparatus ordinarily include a memory for storing data and information such as parameters, coefficients and controls used and generated by the processing steps.

The well tool 13 comprises an elongated housing 26 having a pad device 27 for engaging the surface of the formation 11 and means, such as the diametrically disposed, wall-engaging bow spring 28, for resiliently urging the housing 22 and the pad device 27 toward the opposite borehole wall to hold the pad device 27 in firm engagement with the surface of the formation.

The pad device 27 preferably conforms generally to the contour of the borehole wall and is supported on the housing 22 by extensible members so as to be selectably moveable between an outboard, wall-engaging position and an inboard, retracted position. In the illustrative embodiment shown, the logging device is maintained at the inboard position during movement of the tool 13 in the borehole and is caused to be extended from the housing into engagement with a formation to be tested, for example, by activation of a hydraulic system from the ground surface.

With reference to FIGS. 2 and 3, the pad device 27 includes pressure inducing means 29 comprising fluid reservoirs with restricted openings. When the pad device 27, only portions of which are shown for purposes of clarity, is in the wall-engaging position the openings are brought into contact with the adjacent surfaces of the formation. The means 29 may be energized by a suitable source of electrical energy (not shown) which may be controlled from the surface. Electrokinetic potentials resulting from the fluid flow created in the formation by the applied pressure pulses are detected by a system of electrodes mounted on the pad device 27 and connected through appropriate conductors in the cable 14 to the surface apparatus.

In operation, the well tool 13, is positioned opposite a formation to be investigated, the pad device 27 is extended into engagement with the formation surface (borehole wall) and the pressure inducing means 29 is activated to excite the formation with a pressure pulse. Pressure inducing means 29 may be pulsed repetitively provided the frequency of repetition (which need not be constant) is low and typically within a range of up to 1 khz. The frequency of repetition, as those skilled in the art will recognize, is dictated by the length of time required for a single measurement period. The magnitudes of the resultant electrokinetic potentials are detected by the electrodes so that reliable indications of the several potentials are obtained. If desired, the measurements may be made continuously over a 4 to 5-cycle period of excitation and then averaged.

Figure 4A:
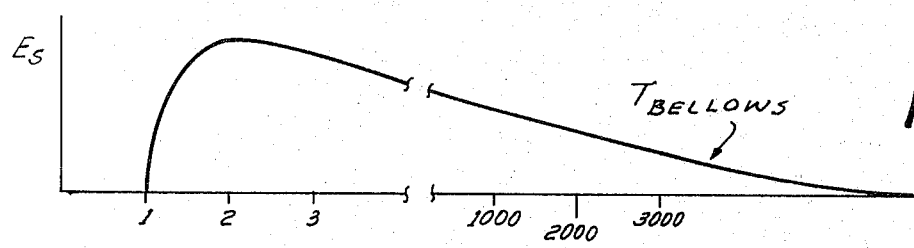
FIGS. 4(a), and 4(b) and 4(c) respectively are graphs of typical streaming potential pulses detected by the respective embodiments of the apparatus of FIGS. 2 and 3.

With particular reference to FIG. 2, the pressure pulse generating means 29, in accordance with one embodiment of the invention, comprises two fluid reservoirs 30 and 32, having respective space apart openings 34, 36 which communicate with the environment outside the pad device 27. The openings are arranged so as to be flush with the borehole wall (i.e. the formation), when the logging device is in the wall-engaging position as discussed above. The reservoirs 30 and 32 respectively comprise bellows arrangements 38 and 40 for effecting the ejection of a fluid, contained in the reservoirs, through the respective openings 34 and 36. In this embodiment the bellows are shown to be driven by a single, common motor 42 which, upon application of suitable driving current to the motor, drives the bellows 38 and 40 in opposition producing a differential pressure of alternating polarity in the adjacent formation. Ring electrodes 44 and 46 are provided around the respective openings 34 and 36. These electrodes are insulated the one from the other and are respectively coupled to an operational amplifier 48 whose output $E_s$, as shown in FIG. 4a, is the magnitude of the streaming potential difference between the electrodes.

While water is an excellent example of a fluid which may be employed in the reservoirs, other fluids, such as aqueous borehole fluids, are also suitable. The volume of the reservoirs, relative to the amount of fluid necessary to effect production of the pressure pulses, is large enough so that the system may be operated for a considerable amount of time before the fluids are depleted or contaminated to a degree which necessitates replenishing the reservoirs. In any case, if borehold fluid is not suitable, additional supplies of fluid may be stored in the tool to effect automatic resupply of respective reservoirs.

To better understand the operation of the apparatus of FIG. 2, some of the theoretical considerations governing its operations are discussed below.

The electrokinetic variables streaming potential ($E_s$) and differential pressure ($\Delta P$) are simply related by $$\frac{E_s(t)}{\Delta P(t)} = \frac{\epsilon \zeta}{4\pi\mu\sigma} \qquad (1)$$

provided that: (a) the flow is laminar, (b) all pore (capillary) radii are much smaller than the electro-chemical double layer thickness, and (c) surface conductance does not dominate that of the bulk fluid. Here $\epsilon$ is the dielectric constant, $\sigma$ is the conductivity, $\mu$ is the viscosity of the fluid, and $\zeta$ is the zeta potential characterizing the solid-liquid surface. Equation (1) has been derived in the literature for porous plugs and has been shown to be a direct consequence of Onsager's principle of irreversible phenomena. Reference may be had to the following for background information: H. R. Kruyt, Colloid Science I, Elsevier Publishing, 1952; P. Sennett, J. P. Olivier, Colloidal Dispensions, Electrokinetic Effects, and the Concept of the Zeta Potential, Chemistry and Physics of Interfaces (D. E. Gushee, Editor), American Chemical Society Publications, 1965; and P. Mazur, J. Th. G. Overbeek, Rec. Trav. Chim. 70, 1951. Thus, it may be established that the temporal behavior of the streaming potential follows that of differential pressure.

In modelling a fluid injection source-formation system with a simple model, a spherical fluid injection source of radius "a" may be assumed to be imbedded in an infinite homogeneous porous medium (i.e. a source located in the formation with no borehole). If the fluid is injected into the medium (formation) from a flexible reservoir (such as a bellows) with cross section A, length l, a radius of injection aperture a, and Young's modulus Y, it may be shown (through the use of Darcy's law and simple physical relationships) that assuming boundary conditions on pressure of $$p(R=\infty, t)=0 \qquad (2)$$

$$p(R=a, t)=P_o(t)-Y \Delta l/l \; tm \; (3)$$

the streaming potential at a measurement distance R from the source is $$E_s(R,t) = \frac{-\epsilon\zeta}{4\pi\mu\sigma} P_o(1 - a/R)e^{-t/T_{bellows}} \qquad (4)$$

where the characteristic response time ($T_{bellows}$) depends simply on flow permeability:

$$T_{bellows} = \frac{Al}{4\pi aY} \frac{\mu}{k} \qquad (5)$$

In equations 3, 4, and 5, $P_o(t)$ is a step force applied by a source on the reservoir, and k is the permeability of the formation. Boundary conditions (2) and (3) are set to account for general assumptions in formation physics. Thus, boundary condition (2) may be understood to indicate that at a distance far from the source, the pressure remains ambient. Equation (3) states that at distances close to the source, the pressure is a function of the input step force $P_o(t)$, and of the bellows compressive properties.

Because A, l, a, and Y are known constants of the bellows reservoir and the viscosity $\mu$ of water is known, permeability may be directly calculated from $T_{bellows}$ as explained below. Deviations from spherical geometry affects this result only through a geometric factor. The simple relationship between response time and permeability is unchanged.

Turning again to FIG. 2, regarding measurements at one borehole depth, the output potential $E_s$ (shown in FIG. 4(a)), which is the difference in magnitude between the streaming potentials measured at the ring electrode 36 and that of the streaming potentials measured at the ring electrode 34, is then determined to obtain indications of the rate of fall-off in fluid pressure in the formation. Characteristic time $T_{bellows}$ is determined by fitting a curve to the slope of the trailing end of the determined pressure transient, in accordance with equation 4. The technique of linear regression is one possible way of fitting the curve. Once $T_{bellows}$ is determined, equation (5) may be employed to provide a measurement of formation permeability.

With reference now to FIG. 3, the best mode embodiment for the pad device 27 of the apparatus of the present invention is shown to comprise a single fluid reservoir 48 and bellows arrangement for ejecting the fluid that is in the reservoir in a manner effecting the production of transient flow in the formations adjoining the opening 52 when the pad is in a wall engaging position in a borehole as previously described. A ring electrode 54 surrounds the opening 52 and additional, spaced apart electrodes 56, 57, 58 and 59 are provided on the pad device 27. All of the electrodes are electrically insulated the one from the other and may be arranged along the pad device 27 so as to be co-linear. Pairs of electrodes are coupled to respective operational amplifiers to derive differential potential measurements.

Figure 4B:
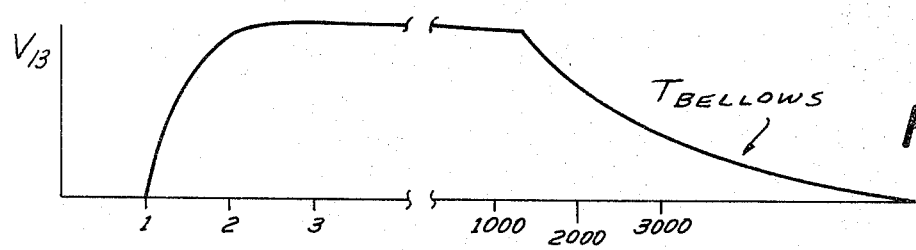
Figure 4C:
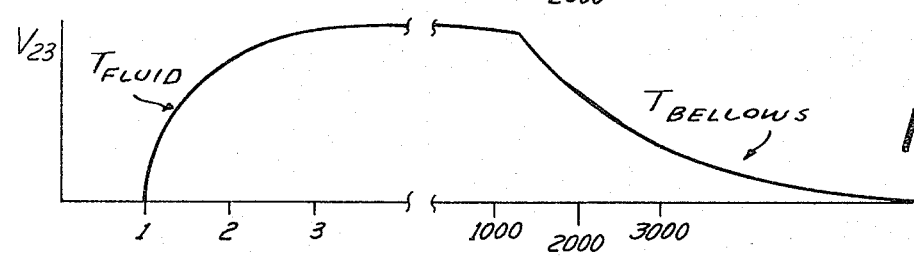

In pursuit of that object, electrode 56 is coupled to operational amplifiers 60 and 61 which respectively receive the outputs of electrodes 58 and 54 and electrode 57 is coupled to operational amplifiers 62 and 63 which respectively receive the outputs of electrodes 59 and 54. Another pair of operational amplifiers 64 and 66 respectively receive the outputs of operational amplifiers 60 and 62 and the outputs of operational amplifiers 61 and 63. For purposes of simplification the output of operational amplifier 64 is designated $V_{23}$ and is illustrated in FIG. 4(c) and that of operational amplifier 66 is designated $V_{13}$ and is illustrated in FIG. 4(b).

Figure 4D:
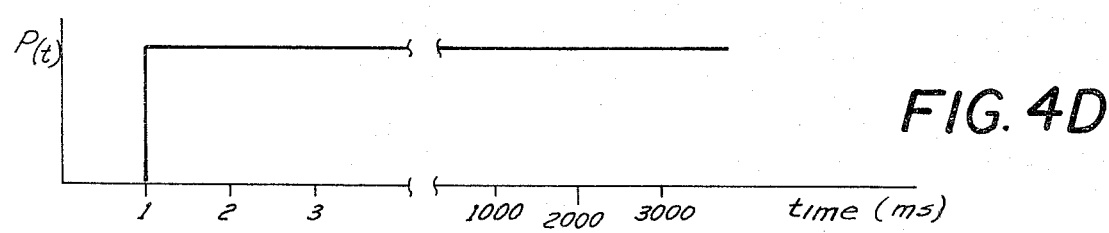
FIG. 4(d) is a graph of an idealized fluid pressure pulse generated by the apparatus of FIG. 1.

The apparatus of FIG. 3, provides certain advantages over that illustrated in FIG. 2. In addition to the simplified pressure pulse generating arrangement, major advantages such as increased accuracy and a technique utilizing the short rise time of the potential transient are realized when the assumption of the form of the pressure pulse, which is idealized in FIG. 4(d), is replaced by an actual measurement of that waveform. Actual measurement is obtained by taking differential potential measurements between electrodes 56, 54 and 57 to obtain the measurement $V_{13}$ illustrated in FIG. 4(b). $V_{13}$ is actually the output of the bellows when a constant mechanical pressure such as P(t) of FIG. 4(d) is applied to the bellows. $V_{13}$ supplies the actual measurement of the pressure pulse waveform, as those skilled in the art will recognize, when electrodes 54 and 57 are at a distance from the source such that the emanating diffusion front does not affect the pressure at those electrodes in the time scale one is looking at, or the effect is so small as to be effectively negligible (i.e. $V_3$ is at relative ground). Differential potential measurements between electrodes 56, 58, 57 and 59, as described above, provide the measurement $V_{23}$, illustrated in FIG. 4(c), which measurement is representative of the streaming potentials generated in the formations near the location where the pressure pulses are applied. From the measurement of the short rise time, or from the long decay time, characteristic times $T_{fluid}$ and $T_{bellows}$ may be determined, and a permeability measurement may be generated as further explained below.

The essential features of the technique as discussed with reference to the embodiment of FIG. 2, are still valid for the embodiment of FIG. 3. Therefore, the conclusion that the flow permeability and characteristic response time of the streaming potentials are simply related still applies. It will be illustrated below that for both the characteristic short rise time $T_{fluid}$ and the characteristic long decay time $T_{bellows}$ the following relationship holds:

$$T_{fluid} \alpha T_{bellows} \alpha 1/k \qquad (6)$$

where k is the formation permeability. To better understand the operation of the FIG. 3 embodiment, some of the theoretical considerations governing its operations are discussed below. It has already been shown that $T_{bellows}$ may be used to derive permeability. Here it is illustrated that a permeability measurement can be derived from the response time of streaming potentials for the characteristic short rise time $T_{fluid}$.

The rise of the streaming potential $V_{23}$, as discussed below, results from the compression of the fluid in the bellows and in the immediately adjoining formation and, unlike the decay time, has nothing to do with the mechanical nature of the bellows for an idealized step pressure input. The time associated with the rise is a result of the competition of the compression of the fluid (pore pressure) and the viscous forces resulting from the formation constitution. Thus, a mathematical model is derived to define the relationships which would permit a determination of formation permeability from the streaming potential rise time.

The constitutive relations for a water saturated soil can be derived by generalizing Hooke's law and including the effects of pore pressure on the principal solid strain only. Using equations derived by M. A. Biot for a solid skeleton (Applied Physics, Volume 12, pages 155-164 (1941); an identification made by Geertsma and Smit, Geophysics, Volume XXVI, No. Z AP 12, 1961; the equation of state for fluid, Darcy's pore fluid diffusion equation, etc., and mass and momentum conservation laws, one can obtain a homogeneous diffusion equation in pore pressure alone:

$$C_D p_{,zz} - p_{,t} = 0 \qquad (7)$$

Where the Einstein convention of repeated indices implying summation has been adopted and where $$C_D = \text{Fluid Diffusivity} = \frac{k\, K_{eff}}{\mu \phi} \quad (8)$$

and $K_{eff}$ = Effective Modulus = (9)

$$K_f\left[1 + \frac{K_f}{\phi\left(K + \frac{4}{3}G\right)}\left\{1 + \frac{1}{K_s}\left[\frac{4}{3}G\left(1 - \frac{K}{K_s}\right) - K - \phi\left(K + \frac{4}{3}G\right)\right]\right\}\right]^{-1}$$

G = Shear Modulus
p = Pore Pressure
K = Bulk Modulus of the Solid Frame
$\phi$ = Porosity
$K_s$ = Bulk Modulus of the Solid Grain
$K_f$ = Bulk Modulus of the Fluid
$\mu$ = Viscosity The solution to Equation 7 is well covered in the literature. Reference may be had to a 1959 Clarendon Press Publication by H. S. Carslaw and J. C. Jaegar entitled "Conduction of Heat in Solids" or such solutions. The fluid modulus $K_f$ and viscosity are known constants, as is the modulus of the rock grains $K_s$. Porosity and the moduli $K_f$ and G are obtainable from acoustic logs and to a very good approximation, may be obtained from the acoustic compressional velocity alone.

In the simple case of a one-dimensional system, the relevant case of a Heaviside pressure source (such as an idealized bellows) at Z=0, zero pressure at Z=l, and zero initial pressure everywhere can be solved. By Laplace transforming Equation 7 and applying boundary conditions (in the Laplace domain):

$$p(z=0) = P_o/s$$
$$p(z=l) = 0 \quad (10)$$

Upon retransformation, pore pressure can be seen to be $$p(z,t) = \quad (11)$$

$$P_o\left[1 - \frac{z}{l} - \frac{2}{\pi}\sum_{n=1}^{\infty}\frac{1}{n}\exp\left(\frac{-n^2\pi^2 C_D t}{l^2}\right)\sin\left(\frac{n\pi z}{l}\right)\right]$$

Pore pressure quickly reduces to dominant exponential behavior with a characteristic rise time of $$T_{fluid} \simeq \frac{l^2}{C_D \pi^2} \quad (12)$$

where, from prior discussion $C_D \alpha k$. From the above outlined analysis (a more complete version being found in an appendix hereto; Appendix A) it was found that for the case of no body forces, time independent boundary conditions, and uncoupled flow and deformation, transient flow is governed by a homogeneous diffusion equation in pore pressure alone. Solving for a case involving sudden application of pore pressure, it was discovered that a characteristic time for pressure diffusion and streaming potential depends on flow permeability.

On a time scale long compared to the rise time characterized by $T_{fluid}$, the streaming potential exhibits a simple exponential decay characterized by the decay time $T_{bellows}$ (Equation (5)), resulting from the competition between bellows compression and the drag forces of Darcy flow.

In the preferred technique for determining formation permeability, bellows 50 is electro-mechanically hit with force P(t) as seen in FIGS. 3 and 4(d). The response of bellows 50 to the step pulse is given by $V_{13}$ as seen in FIG. 4(b). The bellows responds by trying to force fluid out into the formation. In the provided example seen in FIGS. 4(b) and 4(c), in the first millisecond after the application of pressure, little fluid moves into the formation. Rather, the fluid in the bellows and in the immediately adjoining formation takes the load by compressing with a resulting quick rise of pressure at ring electrode 54. As electrodes 56 and 57 are assumed to be at a great distance from electrode 54, they do not see the diffusion wave moving radially outwardly from the source and they are assumed to remain at ambient pressure. In other words, electrodes 56 and 57 act as a relative ground ($V_3$) because the pressure and voltage are a function of the square of the distance from the source as seen in Equations 11 and 12. Thus, the difference in pressure at electrodes 54 and 56 or 57 in fact tracks the output of bellows 50 and can be viewed as the input waveform into the formation instead of the perfect step impulse P(t). As the electrokinetic potential is directly related to the pressure difference, FIG. 4(b) shows the potential $V_{13}$ which may be viewed as the "input" into the formation.

The voltage plateau reached by $V_{13}$ in the short time frame is understood by recognizing that after the first millisecond or so, fluid starts moving out into the formation. As the fluid in the bellows and in the formation undergoes no more compression, the pressure at electrode 54 stops increasing. However, as the force P(t) on the bellows is not relaxed, the pressure remains relatively constant.

In the longer time frame (seconds), the source, measured by $V_{13}$, begins to degenerate. This degeneration is not due to the degeneration of pulse P(t) but is due to the competition between the mechanical nature of the bellows compression and the drag forces of Darcy flow. The compression-viscosity competing forces cause the pressure at electrode 54 to start dropping because the pressure force P(t) is fixed, and the mechanical springs in bellows 50 absorbs some of the force. Thus, the pressure at electrode 54 continues to drop, until the force of the bellows springs equals the step pulse force P(t) and the pressure at electrode 54 relative to ground (electrodes 56 and 57) goes to zero.

While $V_{13}$ has been seen to be the true input pulse into the formation, $V_{23}$ is the output as measured at electrodes 58 and 59 which are in close physical proximity to electrode 54 as opposed to ground electrodes 56 and 57. When the pressure at electrode 54 starts rising, those points close enough to experience the diffusion front emanating quickly outwardly see an increase of pressure (although not of the same magnitude seen at electrode 54). Thus, as illustrated in FIG. 4(c), the pressure and voltage at electrodes 58 and 59 over a few milliseconds quickly rise to a plateau. During this period of time, the pressure at the source electrode 54 has already quickly reached its maximum and has leveled off as seen in FIG. 4(b). Since it takes some time for the diffusion front to reach measurement electrodes 58 and 59, the rise time (characterized by $T_{fluid}$) at the measurement electrodes is longer. After reaching its maximum after about three milliseconds in FIG. 4(c), the voltage maintains a plateau and only decays according to the bellows decay time when the source decays.

$V_{23}$ would provide the information for a direct calculation of $T_{fluid}$ if the rise output $V_{13}$ of the bellows was a perfect duplication of P(t) as seen in FIG. 4(b) in phantom. Thus, a phantom rise of $V_{23}$ in FIG. 4(c) is shown. However, in reality, $V_{13}$ does not perfectly follow P(t) as discussed above, and the streaming potential rise in $V_{23}$ must be corrected to provide a proper $T_{fluid}$. Thus, in the best mode technique for determining formation permeability, the streaming potentials $V_{13}$ and $V_{23}$ are measured over time, digitized and stored. Using $V_{13}$ as the input waveform and $V_{23}$ as the output, $T_{fluid}$ is derived by parametrically fitting a response function of the form:

$$h(t) = e^{-t/T_{fluid}} \tag{13}$$

subject to a minimum least-square error criterion. Permeability may then be derived in accordance with Equations 8–13. It has been discovered that by using:

$$C_D \approx \frac{kK_f}{\mu\phi}\left(1 + \frac{1}{5\phi}\right)^{-1}, \text{ e.g., } K/K_f = 5, K_s = \infty \tag{14}$$

for a variety of natural rocks, good agreement is obtained between measured permeability obtained by using the techniques of the present invention and the known permeabilities of the samples.

If desired, $T_{bellows}$ may be found by linear regression. It has been observed that the estimate of permeability obtained by each of these methods (using $T_{fluid}$ or $T_{bellows}$) agrees to within 10% of the value obtained by a static flow measurement.

Furthermore, even without the use of equation 14, bounds on permeability may still be determined in the absence of information regarding matrix compressional properties ($K_{eff}$) (which, if desired, could be derived from an acoustic log). In an analysis of the characteristic response time of the early portions of the respectively induced transient streaming potentials, from which $T_{fluid}$ is derived, $K_{eff}$, in the absence of other information, can be taken to approach $K_s$ and thus a lower bound value for the formation permeability will be derived. An upper bound value may then be derived from an analysis of later portions of the characteristic response time of the induced transient streaming potentials from which $T_{bellows}$ is derived. As $T_{bellows}$ is not dependent on $K_{eff}$, the determination of $T_{bellows}$ need not be estimated. However, $T_{bellows}$ provides an upper bound value of formation permeability due to the fact that it is dependent on the fluid in the bellows properly entering the formation. Leaks in the system will appear as higher formation permeability, and hence an upper bound value is obtained.

It will be understood, of course, that any desired number of outer electrodes can be provided at spaced intervals along the surface of the logging device 27 and the data thereby provided conveniently employed to derive more accurate information of the electrokinetic potentials at different, closer intervals of the formations. It will be understood that only one measurement electrode is required to practice the invention, as permeability, according to the invention, is derived from streaming potential transient measurements over time.

Those skilled in the art will appreciate that the above-described embodiments of the invention are intended to be merely exemplary, and that they are susceptible of modification and variation without departing from the spirit and scope of the invention. Thus, for example, rise times may vary greatly. While examples are given with respect to FIGS. 4(b) and 4(c), the streaming potential may routinely be found to reach a maximum in as little as 0.1 milliseconds and as long as a few hundred milliseconds, depending on the formation. Likewise, the decay of the streaming potential may be effected by the nature of the particular bellows source used. Nevertheless, for a given bellows reservoir, the $T_{bellows}$ characteristic decay time is found to be the same for formations of equal permeability. Moreover, those skilled in the art will appreciate that different types of sources may be employed as long as a transient streaming potential is formed. All such variations and modifications, therefore, are included within the scope of the invention as set forth in the appended claims.

APPENDIX A

The constitutive relations for a water-saturated soil can be derived by generalizing Hooke's Law and including the effect of pore pressure on the principal solid strains only. The following equations were derived for the solid skeleton by M. A. Biot. Reference may be had to an article published in the Journal of Applied Physics, Volume 12, pages 155–164 (1941) and authored by Biot. For incompressible fluid the constitution relations are:

$$2G\epsilon_{ij} = \sigma_{ij} - \frac{\nu}{1+\nu}\sigma_{kk}\delta_{ij} + \frac{2G}{3H}p\delta_{ij} \tag{15}$$

where
G = Shear Modulus.
E = Young's Modulus.
$\nu$ = Poisson's Ratio.
p = Pore Pressure.
H = Biot's experimental constant measuring aggregate dilation for a change in pore pressure.
$\sigma_{ij}$ = Total Stress Tensor.
$\epsilon_{ij}$ = Solid Strain Tensor.

and all material parameters represent the aggregate under drained (constant pore pressure) conditions; and $$K = \text{Bulk Modulus of Solid Frame:} \tag{16}$$

$$= \frac{2G(1+\nu)}{3(1-2\nu)}$$

where the Einstein convention of repeated indices implying summation has been adopted. Thus $\sigma_{kk}$ is the hydrostatic stress: $(\sigma_{kk} = \sigma 11 + \sigma 22 + \sigma 33)$.

For the fluid, the constitutive relation is $$\Delta\phi = \frac{1}{3H}\sigma_{kk} + \frac{p}{R} \tag{17}$$

where R is another experimental constant and $\phi$ is the porosity. Geertsma and Smit, Geophysics, Vol. XXVI, No. Z AP12, 1961, make the identification:

$$\frac{1}{H} = \frac{1}{K}[1 - K/K_s]$$

$$\frac{1}{R} = \frac{1}{K}\left[1 - \frac{K}{K_s}(1+\phi)\right]$$

where $K_s$ is the bulk modulus of the solid grains. The constituitive relations then become:

$$2G\epsilon_{ij} = \sigma_{ij} - \frac{\nu}{1+\nu}\sigma_{kk} + \frac{(1-2\nu)}{1+\nu}(1 - K/K_s)p\delta_{ij} \quad (18)$$

$$\Delta\phi = \frac{1}{3K}(1 - K/K_s)\sigma_{kk} + \frac{p}{K}\left(1 - \frac{K(1+\phi)}{K_s}\right) \quad$$

The linearized change in fluid mass within a volume element of aggregate is:

$$\Delta m_f = \phi_0 \Delta\rho + \rho_0 \Delta\phi \quad (19)$$

where $\phi_0$, $\rho_0$ are the unstressed reference values of the porosity and fluid density, respectively. The equation of state for the fluid is:

$$C_p^2 = \frac{K_f}{\rho_0} = \frac{p}{\rho - \rho_0} \quad (20)$$

where $K_f$ = Bulk Modulus of the fluid.

Mass conservation within a unit volume element requires:

$$q_{i,i} + m_{,t} = 0 \quad (21)$$

Pore fluid diffusion in a homogeneous media is governed by the Darcy equation:

$$q_i = -\frac{\rho_0 k}{\mu} p_{,i} \quad (22)$$

Finally, the equation of momentum conservation is, for no body forces $$\sigma_{ij,j} = 0 \quad (23)$$

Combining these equations, one obtains, for the case of time-independent boundary conditions (including Heaviside functions) or infinite spatial extent (i.e., single dimensional flow), a homogeneous diffusion equation in pore pressure alone:

$$C_D P_{,zz} - P_{,t} = 0 \quad (24)$$

where $C_D$ = fluid diffusivity = $\frac{kK_{eff}}{\mu\phi}$ and $K_{eff}$ =

Effective Modulus = $K_f\left[1 + \frac{K_f}{\phi\left(K + \frac{4}{3}G\right)}\left(1 + \frac{1}{K_s}\left[\frac{4}{3}G(1 - K/K_s) - K - \phi\left(K + \frac{4}{3}G\right)\right]\right)\right]^{-1}$ the solutions of which are well covered in the literature. Reference may be had to a 1959 Clarendon Press publication by H. S. Carslaw and J. C. Jaegar entitled "Conduction of Heat in Solids" for such solutions. The fluid modulus $K_f$ and viscosity are known constants, as is the modulus of the rock grains $K_s$. Porosity and the moduli $K_f$ and G are obtainable from acoustic logs and to a very good approximation, may be obtained from the acoustic compressional velocity alone.

One may then wish to consider relevant cases where Heaviside pressure source at z=0, zero pressure at z=1, and zero initial pressure everywhere.

The partial differential equation (24) is reduced to an ordinary differential equation via Laplace transformation:

$$p_{,zz} - \alpha^2 p = 0$$

$$\alpha^2 = s/C_D \quad (25)$$

The general solution is:

$$P = Ae^{-\alpha z} + Be^{+\alpha z} \quad (26)$$

Applying boundary conditions:

$$P(z=0) = P_o/s = A + B$$

$$P(z=l) = 0 = AE^{-\alpha l} + Be^{+\alpha l}$$

yields $$P(z,s) = \frac{P_o}{s} \frac{1}{1 - e^{-2\alpha l}} (e^{-\alpha z} - e^{+\alpha(z-2l)}) \quad (27)$$

The transform is:

$$p(z,t) = \quad (28)$$

$$P_o\left[1 - \frac{z}{l} - \frac{2}{\pi}\sum_{n=1}^{\infty}\frac{1}{n}\exp\left(\frac{-n^2\pi^2 C_D t}{l^2}\right)\sin\left(\frac{n\pi z}{l}\right)\right]$$

Pore pressure quickly reduces to dominant exponential behavior with a characteristic time of:

$$T_{fluid} \approx \frac{l^2}{C_D \pi^2} \quad (29)$$

I claim:

1. A method for investigating the permeability of earth formations traversed by a borehole comprising the steps of:
   positioning in contact with the surface of the borehole within a formation to be investigated a source of mechanical excitation;
   actuating the source to excite the formation so as to cause to be produced an electrokinetic potential transient in the formation around the area of contact;
   measuring the magnitude of the electrokinetic potentials excited in the formation;
   determining a characteristic response time for the electrokinetic potentials excited in the formation; and
   producing as a function of said determined characteristic response time an indication of formation permeability.

2. A method according to claim 1 further comprising:
sequentially exciting the formation at two separate locations;
measuring the magnitude of the electrokinetic potentials at said locations; and
deriving a differential measurement of the magnitude of the electrokinetic potentials at each of said locations.

3. A method according to claim 1 wherein:
the source of said actuating step is repetitively actuated, and said measuring step which measures the magnitude of said electrokinetic potentials excited in the formation is repeated for each actuation of the source, the measurements being averaged in determining a characteristic response.

4. A method for investigating the permeability of earth formations traversed by a borehole comprising the steps of:
positioning in contact with the surface of a formation a mechanical transducer which effects the injection of a fluid into the formation;
actuating the transducer to inject fluid under pressure into the formation so as to excite the formation and cause an electrokinetic potential transient to be produced in the formation;
measuring the magnitude of the electrokinetic potentials excited in the formation;
determining a characteristic response time for the electrokinetic potentials excited in the formation; and
producing as a function of said characteristic response time an indication of formation permeability.

5. A method according to claim 4 further comprising:
sequentially exciting the formation at two separate locations;
measuring the magnitude of the electrokinetic potentials at said locations; and
deriving a differential measurement of the magnitude of the electrokinetic potentials at each of said locations.

6. A method according to claim 4 wherein:
the transducer of said actuating step is repetitively actuated, and said measuring step which measures the magnitude of said electrokinetic potentials excited in the formation is repeated for each actuation of the transducer, the measurements being averaged in determining a characteristic response time.

7. Apparatus for investigating the permeability of earth formations traversed by a borehole comprising:
a source of mechanical excitation;
means for positioning the excitation source in contact with the borehole wall adjacent a formation to be investigated when said apparatus is in a borehole;
means for actuating the source so that when the source is adjacent a formation it is effective to excite the formation so as to cause to be produced an electrokinetic potential transient in the formation;
means comprised within said positioning means for measuring an electrokinetic potential transient;
means for determining a characteristic response time of said formation from the output of the measuring means; and
means for producing as a function of said characteristic response time an indication of formation permeability.

8. Apparatus according to claim 7 wherein:
said source of mechanical excitation is capable of causing repetitive mechanical excitation.

9. Apparatus according to claim 7 wherein:
the source of mechanical excitation comprises a fluid injector.

10. Apparatus according to claim 7 wherein:
said electrokinetic potential transient measuring means comprises a plurality of electrodes arranged in spaced apart relationship about said source.

11. Apparatus for investigating the permeability of earth formations traversed by a borehole comprising:
a body member sized for passage through a borehole;
a pad device carried on said body member;
means carried on said body member for selectively bringing said pad device into engagement with the surrounding borehole surface when said body member is in a borehole;
a source of mechanical excitation carried on said pad device which mechanical excitation is effective in causing an electrokinetic potential transient in a fluid filled porous material when the source is adjacent a fluid filled porous material;
means, carried on said pad device, for measuring an electrokinetic potential transient;
means for determining a characteristic response time of said formation from the output of said measuring means; and
means for producing as a function of said characteristic response time an indication of formation permeability.

12. Apparatus according to claim 11 wherein:
said source of mechanical excitation is capable of causing repetitive mechanical excitation.

13. Apparatus according to claim 11 wherein:
the source of mechanical excitation comprises a fluid injector.

14. Apparatus according to claim 11 wherein:
said electrokinetic potential transient measuring means comprises a plurality of electrodes arranged in spaced apart relationship about said source.

15. A method for recording the permeability of earth formations traversed by a borehole comprising the steps of:
positioning at a depth and in proximity to a borehole wall in a formation a tool capable of causing electrokinetic potential transients to be formed in said formation;
actuating the tool so as to cause to be produced an electrokinetic potential transient in said formation around said depth;
measuring the magnitude of the electrokinetic potential formed in said formation at at least one determined location around said depth;
determining a characteristic response time for said electrokinetic potential transient formed in said formation;
producing as a function of said determined characteristic response time an indication of formation permeability; and
recording said indication of formation permeability as a function of said depth.

16. A method according to claim 15 further comprising:
actuating said tool sequentially so as to cause to be produced an electrokinetic potential transient at two separate locations;
measuring the magnitude of the electrokinetic potentials formed at said locations; and deriving a differential measurement of the magnitude of the electrokinetic potentials at each of said locations.

17. A method according to claim 15 wherein:
the tool of said actuating step is repetitively actuated, and said measuring step which measures the magnitude of said electrokinetic potentials formed in said formation is repeated for each actuation of the tool, the measurement being averaged in determining a characteristic response time.

18. A method according to claim 15 wherein:
said determined characteristic response time is the rise time ($T_{fluid}$) of said measured electrokinetic potential.

19. A method according to claim 16 wherein:
said determined characteristic response time is the rise time ($T_{fluid}$) of said measured electrokinetic potential.

20. A method according to claim 15 wherein:
said determined characteristic response time includes both the rise time ($T_{fluid}$) and decay time ($T_{bellows}$) of said measurement electrokinetic potential.

21. A method according to claim 16 wherein:
said determined characteristic response time includes both the rise time ($T_{fluid}$) and decay time ($T_{bellows}$) of said measurement electrokinetic potential.

22. A method according to claim 15 wherein:
said tool actuated to produce said electrokinetic potential transient in said formation produces said electrokinetic potential transient by applying a fast rising fluid pressure pulse into said formation.

23. Apparatus for recording the permeability of earth formations traversed by a borehole comprising:
a tool capable of causing electrokinetic potential transients to be formed in a formation;
positioning means for positioning said tool in proximity to the borehole wall;
actuating means for actuating the tool so that when the tool is in proximity to the borehole wall, it is effective in producing an electrokinetic potential transient in said formation;
at least one measuring means for measuring an electrokinetic potential transient;
means for determining a characteristic response time of said formation from the output of said measuring means;
means for producing as a function of said determined characteristic response time an indication of formation permeability; and
recording means for recording said indication of said formation permeability as a function of formation depth.

24. Apparatus according to claim 23 wherein:
said tool is capable of repetitively causing electrokinetic potential transients to be formed in said formation.

25. Apparatus according to claim 24 wherein:
said at least one measuring means comprises a plurality of electrodes arranged in spaced relationship about said tool.

26. Apparatus according to claim 23 wherein:
said tool capable of causing electrokinetic potential transients to be formed in said formation includes a fluid injector.

* * * * *